Nov. 14, 1939.     F. M. TRAPNELL     2,179,531
NAVIGATIONAL INSTRUMENT
Filed July 20, 1938     2 Sheets-Sheet 1

INVENTOR
FREDERICK M. TRAPNELL
BY
ATTORNEY

Nov. 14, 1939.   F. M. TRAPNELL   2,179,531
NAVIGATIONAL INSTRUMENT
Filed July 20, 1938   2 Sheets—Sheet 2

INVENTOR
FREDERICK M. TRAPNELL
BY
ATTORNEY

Patented Nov. 14, 1939

2,179,531

UNITED STATES PATENT OFFICE 2,179,531

NAVIGATIONAL INSTRUMENT

Frederick M. Trapnell, United States Navy

Application July 20, 1938, Serial No. 220,343

2 Claims. (Cl. 235—89)

(Granted under the act of March 3, 1883, as amended April 30, 1928; 370 O. G. 757)

My invention relates broadly to a navigational instrument and more particularly to one for use in aerial navigation.

An object of the invention is to provide an instrument by means of which the most economical speed for an aircraft in flight under various wind conditions may be ascertained quickly and easily.

Another object of the invention is to provide an instrument by means of which the ground speed, fuel consumption and mileage per a given number of gallons of fuel are immediately apparent by inspection for any R. P. M. at any altitude and under various wind conditions.

With the above and other objects in view the invention consists in the construction, combination and arrangement of parts as will be described more fully hereinafter.

Figure 1:
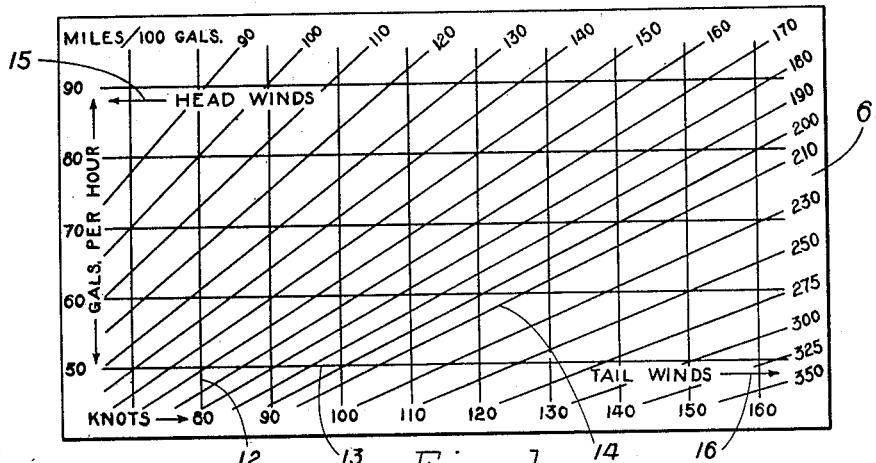
Figure 2:
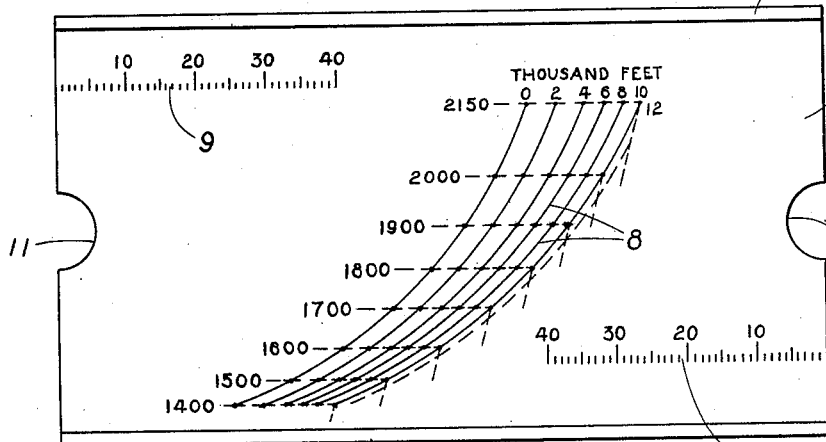
Figure 4:
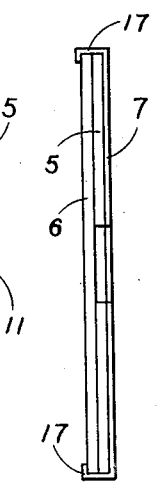
Figure 3:
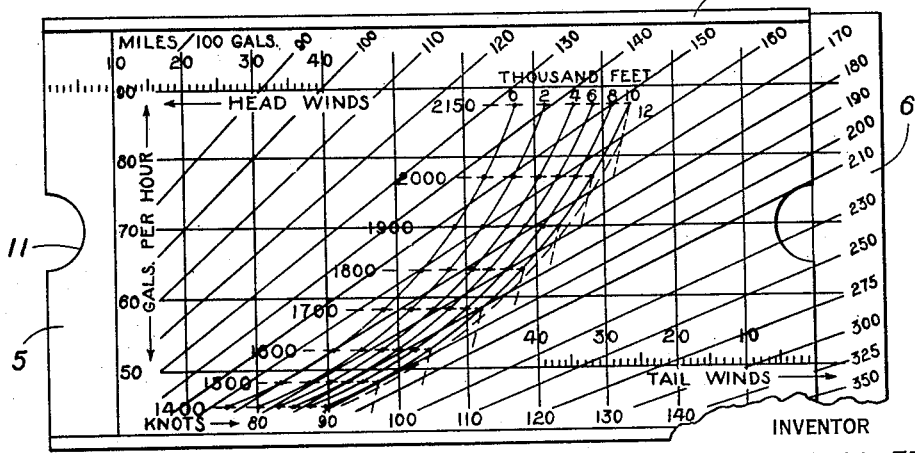
Figure 5:
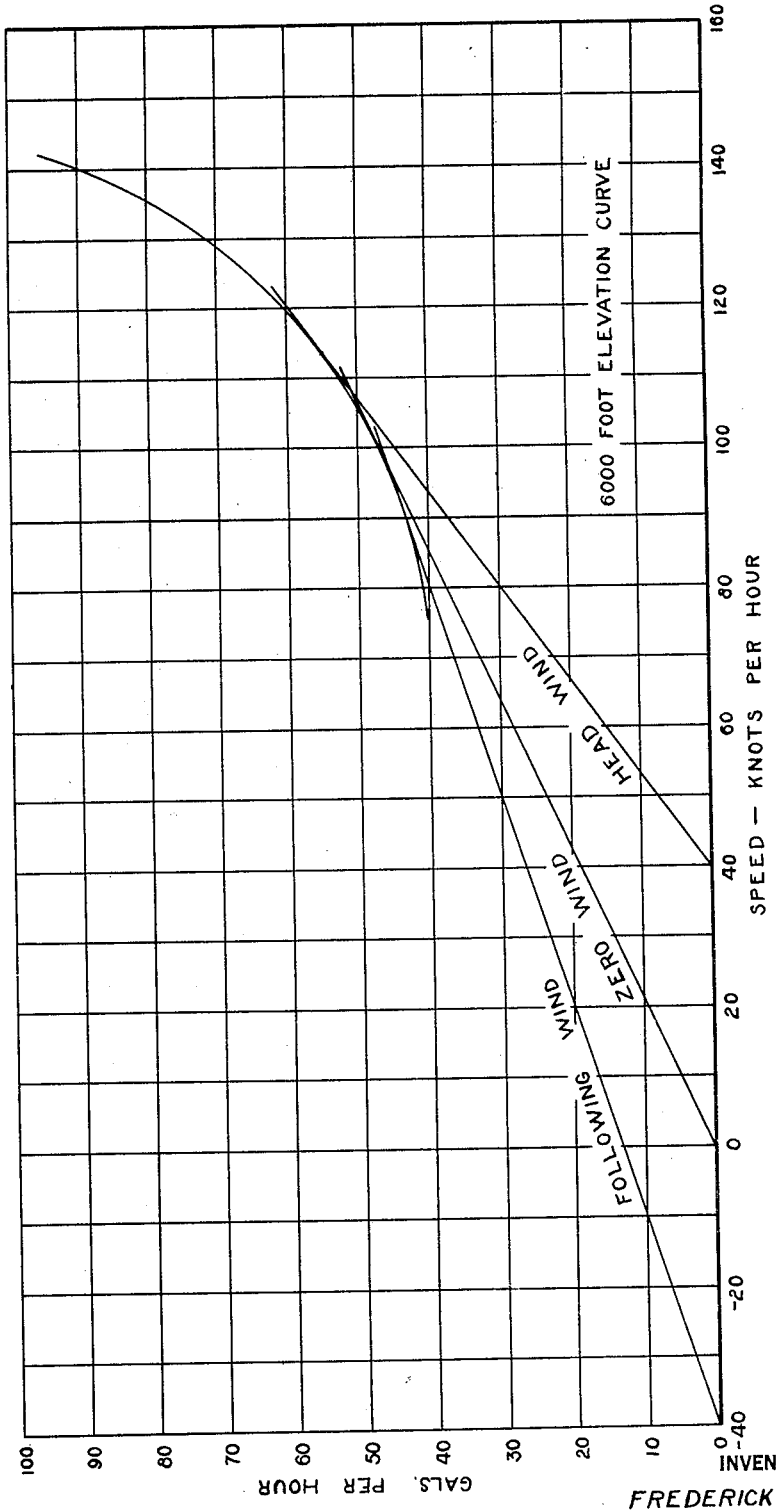

Reference is to be had to the accompanying drawings, forming a part of the specification, in which like reference characters indicate corresponding parts throughout the several views, and in which Fig. 1 is a plan view of the slidable plate used in the invention, Fig. 2 is a plan view of the base member, Fig. 3 is a plan view of the slidable plate and base member co-related to solve a problem, Fig. 4 is an end view of the assembled instrument, and Fig. 5 is a graph showing the theory of practical use of the invention.

Referring more particularly to the drawings, my invention consists of a bottom or base member 5, a top plate 6 slidable with respect to and over the base member, and a frame 7 for holding the two aforesaid members in an assembled position.

The base member may be of either a transparent or an opaque material, but the latter is desirable, for then suitable indicia may be placed upon both sides of the member without incurring liability of confusion in the indicia on one side showing through on the other side. By thus making this member reversible, plotting data at two loading conditions may be indicated upon but one member.

The indicia referred to include curves drawn to indicate gallons of fuel consumption per hour versus miles per hour, and scales for setting for head or tail winds. The curves are plotted preferably in altitudes of 2000 feet, commencing at "sea level". Although these curves are desirably plotted in altitudes, it is to be understood that they do not in any manner assist in the determination of altitude at which the aircraft is flying. That being ascertained from suitable instruments carried by the aircraft. They are plotted merely for the solution of the problem for which the device is designed; that is, to determine the most economical engine speed for the particular altitude at which the aircraft may be flying. As indicated by the numerals along side the bank of curves, the curves are spotted in R. P. M. for the aircraft propeller. The scales 9 and 10, appearing on the base member, are desirably arranged in reversed order, one near the top and one near the bottom of the base member and on opposite sides of the bank of curves. This particular placing of the scales not only conserves space but also separates them so no confusion in their purpose will exist. By referring to the slidable plate, Fig. 1, it will be noted the scale on the left is used when "head winds" prevail and the one on the right is used when "tail winds" prevail. A more complete explanation of the purpose of these scales will be given hereinafter. It will be observed that it is desirable to cut away a portion of the base member at its ends, as at 11, to provide finger spaces whereby the slidable plate may be grasped easily.

Referring to Fig. 1, showing the slidable plate 6, it will be seen that this plate is provided with rectangular and radial co-ordinates. The vertical lines 12 are scaled in knots, the horizontal lines 13 are scaled in gallons per hour, and the radial lines 14 are scaled in miles per gallon. Of course these particular scalings are optional. This plate, which is of a transparent material, is provided with arrows 15 and 16 pointing in opposite directions and labelled "head winds" and "tail winds", the former cooperating with the left hand scale on the base member, and the latter cooperating with the right hand scale, and are respectively used when flying into or with the wind.

The frame 7, supporting the base member and slidable plate, may be of any desirable material that is light in weight, yet durable in use. Its edges are bent to provide guideways into which the several indicia marked elements are inserted, as shown at 17 in Fig. 4. The tension of the upset edges of the frame on the assembled elements should be such that they may be moved easily by hand, yet be held firmly against accidental movement. The frame, like the base member, has its ends cut away to register with the cut away portion 11 when the base member is squarely mounted in the frame, as shown in Fig. 2, for easy gripping of the plate 6 that it may be moved quickly and properly to set up a problem.

The most economical speed of an aircraft engine is affected considerably by wind direction and force, being increased by head winds and decreased by tail or following winds. If the fuel consumption in gallons per hour is plotted against air speed in miles per hour, with both scales starting from zero, then a line drawn from any point on the speed axis is tangent to the curve at the most economical speed for the wind condition determined by the starting point. Since the ground speed is the difference between the air speed and the wind speed, the starting point or origin for ground speed is moved to the right or left for head winds or tail winds, respectively. That is with a 40 mile per hour head wind, the ground speed will be 40 miles per hour less than the air speed, and the origin will be at 40 knots. A line drawn from this point in Fig. 5 is tangent to the curve at approximately 113 knots, which is the most economical speed for a 40 mile per hour head wind. Similar tangents drawn for a zero wind and a 40 mile per hour tail wind indicate economical speeds of 100 knots and 92 knots, respectively.

As an example of the way in which a problem is solved by the above described instrument, let it be assumed that the aircraft is flying at an altitude of 6000 feet into a head wind of 10 miles per hour. These figures being known, the navigator of the aircraft moves the slidable plate 6 so that its left hand edge coincides with the mark 10 in the "head wind" scale 9, as shown in Fig. 3. With his eye he then follows the curve 8 for the altitude 6000 feet, and notes the point it becomes tangent to one of the radial lines 14. This point is found to be approximately 1525 on the values of R. P. M. for the aircraft propeller. That is to say, for the most economical operation of the aircraft flying at an altitude of 6000 feet into a 10 mile per hour head wind, the propeller should be driven at approximately 1525 revolutions per minute. Following the radial line to which that particular curve is tangent to the upper right hand corner of the plate, it will will be found that approximately 190 miles can be made on 100 gallons of fuel flying at an approximate speed of 95 knots in the line of flight, as indicated by the vertical line 12, and that approximately 48 gallons of fuel will be consumed per hour, shown by the horizontal line 13. The same procedure is followed should the wind be of a different velocity or the aircraft flying at another altitude; or should there be a tail wind instead of a head wind, the right hand edge of the slidable plate 6 is made to coincide with the particular degree mark on the scale 10. Should other than a head or tail wind prevail, its component in the line of flight is ascertained and used in solving the problem.

It will thus be seen that there has been devised an instrument that is of great utility in the art of aerial navigation, one that is simple and easy in operation, one that occupies a minimum of space when not in use, and by having a plurality of transferable base members, one which will permit of exchange between aircraft under different loading conditions.

It will be understood that the above description and accompanying drawings comprehend only the general and preferred embodiment of my invention and that various changes in the details of construction, proportion and arrangement of parts may be made within the scope of the appended claims and without sacrificing any of the advantages of my invention.

The invention herein described and claimed may be used and/or manufactured by or for the Government of the United States of America for governmental purposes without the payment of any royalties thereon or therefor.

Having described my invention what I claim as new is:

1. An aerial navigational instrument including in combination a base member having thereon indicia including a graph, the graph representing engine performance at a given altitude but definite load, a scale of engine speeds in R. P. M., a scale calibrated in head wind velocity and a reverse scale calibrated in tail wind velocity, and a transparent plate slidable over the base member having thereon indicia including a plurality of parallel horizontal lines indicating fuel consumption per hour, a plurality of parallel vertical lines indicating speed intersecting the horizontal lines, and a plurality of divergent radial lines indicating miles per 100 gallons of fuel, said graph and wind velocity scales on the base plotted to cooperate with the indicia on the transparent slidable plate, whereby given the wind velocity, the point of tangency of one of the radial lines with the graph will form a reference point which projected to the engine speed scale will indicate the most economical engine speed obtainable under the given wind and load conditions.

2. The combination of a sheet having thereon rectangular co-ordinates and a plurality of lines radiating from the co-ordinate origin, a second sheet having thereon a graphic curve and two scales, each of said scales being parallel to the X-axis of the co-ordinates of the first named sheet and progressing in opposite directions from the Y-axis of said co-ordinates, the distance between the main graduations on said scale being the same as the graduation on the X-axis on the first named sheet, the said sheet bearing the co-ordinate origin and radial lines being shiftable horizontally in relation to the graphic curve, whereby the point of tangency of a radial line to the graphic curve may be ascertained to determine the minimum ratio between ordinate and abscissa of any point on the graphic curve.

FREDERICK M. TRAPNELL.